(12) United States Patent
Cui et al.

(10) Patent No.: US 11,012,966 B2
(45) Date of Patent: May 18, 2021

(54) LOCATION POSITIONING PROTOCOL BASED POSITIONING FOR UES IN IDLE MODE

(71) Applicant: Apple Inc., Cupertino, CA (US)

(72) Inventors: Jie Cui, Santa Clara, CA (US); Yang Tang, Pleasanton, CA (US); Hyung-Nam Choi, Hamburg (DE); Seung Hee Han, San Jose, CA (US); Marta Martinez Tarradell, Hillsboro, OR (US); Youn Hyoung Heo, Seoul (KR)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/477,572

(22) PCT Filed: Dec. 29, 2017

(86) PCT No.: PCT/US2017/069122
§ 371 (c)(1),
(2) Date: Jul. 12, 2019

(87) PCT Pub. No.: WO2018/136224
PCT Pub. Date: Jul. 26, 2018

(65) Prior Publication Data
US 2019/0373573 A1   Dec. 5, 2019

Related U.S. Application Data

(60) Provisional application No. 62/447,138, filed on Jan. 17, 2017.

(51) Int. Cl.
*H04W 64/00* (2009.01)
*H04W 76/28* (2018.01)
(Continued)

(52) U.S. Cl.
CPC ......... *H04W 64/003* (2013.01); *G01S 5/0036* (2013.01); *G01S 5/10* (2013.01);
(Continued)

(58) Field of Classification Search
CPC . H04W 64/00; H04W 64/003; H04W 64/006; H04W 4/029; H04W 4/02; G01S 1/20; H04L 5/0048
See application file for complete search history.

(56) References Cited

U.S. PATENT DOCUMENTS

| 2010/0323683 A1* | 12/2010 | Kazmi | H04W 64/00 455/422.1 |
| 2010/0323719 A1* | 12/2010 | Jen | H04W 64/00 455/456.1 |

(Continued)

FOREIGN PATENT DOCUMENTS

| WO | 2014/168539 A | * 8/2014 | H04W 24/10 |
| WO | 2014/168539 A1 | 10/2014 | |

OTHER PUBLICATIONS

Author Unknown, WF on FeMTC OTDOA TxD Support, Doc. No. R1-1703629, pp. 1-4, Feb. 17, 2016 (Year: 2016).*

(Continued)

*Primary Examiner* — Christopher M Crutchfield
(74) *Attorney, Agent, or Firm* — Eschweiler & Potashnik, LLC

(57) ABSTRACT

Techniques described herein allow for mobile positioning (i.e., the determination of the position of the UE) to be performed when the UE is in Idle mode. In some implementations, assistance data, that is used by the UE as part of the mobile positioning procedure, may be broadcast to the UE or transmitted to the UE within paging messages. The assistance data can potentially be sent to the UE in a number of time slots. In some implementations, the UE may perform measurements needed for mobile positioning only within discontinuous reception (DRX) occasions. Alternatively, in some implementations, the UE may perform measurements needed for mobile positioning outside of DRX occasions.

21 Claims, 10 Drawing Sheets

(51) Int. Cl.

| | | |
|---|---|---|
| *H04W 76/27* | (2018.01) | |
| *H04W 36/00* | (2009.01) | |
| *G01S 5/00* | (2006.01) | |
| *G01S 5/10* | (2006.01) | |
| *H04L 5/00* | (2006.01) | |
| *H04W 48/16* | (2009.01) | |

(52) U.S. Cl.
CPC ......... *H04L 5/005* (2013.01); *H04W 36/0085* (2018.08); *H04W 48/16* (2013.01); *H04W 64/006* (2013.01); *H04W 76/27* (2018.02); *H04W 76/28* (2018.02)

(56) References Cited

U.S. PATENT DOCUMENTS

| | | | | |
|---|---|---|---|---|
| 2011/0034165 A1* | 2/2011 | Hsu | ................... | H04W 36/0088 455/423 |
| 2012/0194383 A1* | 8/2012 | Kawaguchi | ............. | G01S 19/11 342/357.48 |
| 2013/0053091 A1* | 2/2013 | Jorguseski | ........ | H04W 52/0225 455/524 |
| 2015/0018010 A1* | 1/2015 | Fischer | ................. | H04W 76/28 455/456.2 |
| 2015/0072708 A1 | 3/2015 | Lim et al. | | |
| 2016/0097835 A1* | 4/2016 | Zhang | ................. | H04L 27/2613 370/329 |
| 2017/0273136 A1* | 9/2017 | Siomina | ................ | H04W 76/28 |
| 2017/0332330 A1* | 11/2017 | Dhandu | .................. | H04W 4/70 |
| 2018/0054795 A1* | 2/2018 | Edge | .................... | H04W 4/029 |
| 2018/0098187 A1* | 4/2018 | Blankenship | ....... | H04L 27/2602 |
| 2018/0343132 A1* | 11/2018 | Maheshwari | ......... | H04W 24/10 |

OTHER PUBLICATIONS

Author Unknown, Positioning measurements in idle mode for NB-IoT, pp. 1-2, May 19, 2017 (Year: 2017).*
International Preliminary Report on Patentability dated Aug. 1, 2019 for International Application No. PCT/US2017/069122.
International Search Report dated Apr. 1, 2019 for International Application No. PCT/US2017/069122.
"Correction on Broadcast of assistance data." Siemens AG. Change Request. 3GPP TSG-RAN WG2 Meeting #25, Makuhari, Japan, Nov. 26-30, 2001. R2-012643.

* cited by examiner

LOCATION POSITIONING PROTOCOL BASED POSITIONING FOR UES IN IDLE MODE

RELATED APPLICATIONS

This application is a National Phase entry application of International Patent Application No. PCT/US2017069122 filed Dec. 29, 2017, which claims priority to U.S. Provisional Patent Application No. 62/447,138, which was filed on Jan. 17, 2017, in the name of Jie Cui et al. and is hereby incorporated by reference in its entirety.

BACKGROUND

The Location Position Protocol (LPP) in the Third Generation Partnership Project (3GPP) standards for cellular communications use Observed Time Difference Of Arrival (OTDOA) of certain downlink (DL) signals to determine a position of a UE. The LPP may use multilateration techniques in which User Equipment (UE) measures the time of arrival (TOA) of signals received from multiple base stations. Based on the TOAs and the known locations of the base stations, the location of the UE may be calculated. As part of position determination suing OTDOA, the network may transmit assistance data to the UE. The assistance data may include configuration information describing when positioning signals, such as Positioning Reference Signals (PRS), are expected to arrive at the UE.

For some types of UEs, such as Internet of Things (IoT) UEs, operating in a low power mode, for extended periods, may be an important consideration in the design of the UEs. Such UEs may frequently be in an Idle state. In general, an Idle state UE, in contrast to being in the Connected state, may not have an active radio link with the network. Instead, an Idle state UE may be in a long discontinuous reception (DRX) cycle for monitoring downlink signals without transmitting to the network. Existing UEs, when in Idle mode, may not be capable of performing OTDOA positioning. For example, the Idle state may complicate the ability of the UE to receive the assistance data.

BRIEF DESCRIPTION OF THE DRAWINGS

Embodiments described herein will be readily understood by the following detailed description in conjunction with the accompanying drawings. To facilitate this description, like reference numerals may designate like structural elements. Embodiments are illustrated by way of example and not by way of limitation in the figures of the accompanying drawings.

DETAILED DESCRIPTION OF PREFERRED EMBODIMENTS

The following detailed description refers to the accompanying drawings. The same reference numbers in different drawings may identify the same or similar elements. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For a number of reasons, determining the position of a UE in Idle mode can be challenging. Various techniques described herein allow for mobile positioning (i.e., the determination of the position of the UE) to be performed even when the UE is in Idle mode. In some implementations, assistance data, that is used by the UE as part of the mobile positioning procedure, may be broadcast to the UE or transmitted to the UE within paging messages. The assistance data can potentially be sent to the UE in a number of time slots. In some implementations, the UE may perform measurements needed for mobile positioning only within discontinuous reception (DRX) occasions. Alternatively, in some implementations, the UE may perform measurements needed for mobile positioning outside of DRX occasions.

Additionally, in some implementations, the UE may prioritize the reading of system information (SI) in Idle over mobile positioning measurements. In this situation, the positioning measurement period may be extended. Alternatively, the UE may prioritize mobile positioning measurements over the reading of the SI information.

Additionally, in some implementations, requests to UEs, to perform mobile positioning measurements, may be sent to all the cells in a tracking area.

Figure 1:
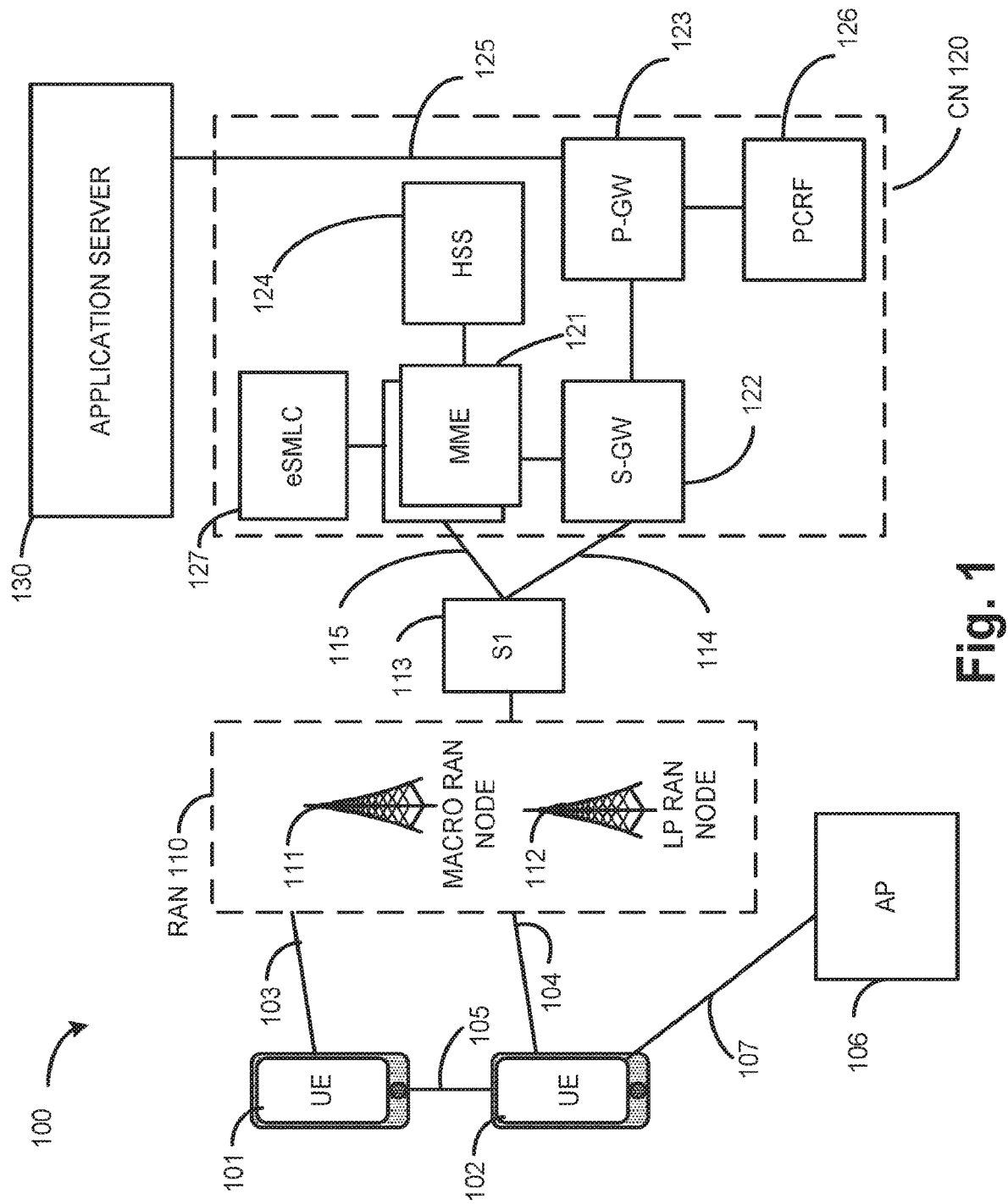
FIG. 1 illustrates an architecture of a system in accordance with some embodiments.

FIG. 1 illustrates an architecture of a system 100 in accordance with some embodiments. The system 100 is shown to include a user equipment (UE) 101 and a UE 102. The UEs 101 and 102 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 101 and 102 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network. One type of IoT device, Narrowband IoT (NB-IoT) UEs, may be IoT UEs capable of operating at low bandwidths.

The UEs 101 and 102 may be configured to connect, e.g., communicatively couple, with a radio access network (RAN) 110—the RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as a connection consistent with any IEEE 802.11 protocol, wherein the AP 106 would comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management.

In accordance with some embodiments, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 101 and 102. The physical downlink control channel (PDCCH) may carry information about the transport format and resource allocations related to the PDSCH channel, among other things. It may also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 111 and 112 based on channel quality information fed back from any of the UEs 101 and 102. The downlink resource assignment information may be sent on the PDCCH used for (e.g., assigned to) each of the UEs 101 and 102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 110 is shown to be communicatively coupled to a core network (CN) 120—via an S1 interface 113. In embodiments, the CN 120 may be an evolved packet core (EPC) network, a NextGen Packet Core (NPC) network, or some other type of CN. In this embodiment, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this embodiment, the CN 120 comprises the MMEs 121, the S-GW 122, the Packet Data Network (PDN) Gateway (P-GW) 123, a home subscriber server (HSS) 124, and an enhanced Serving Mobile Location Center (eSMLC) 127. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities may include lawful intercept, charging, and some policy enforcement.

The P-GW 123 may terminate an SGi interface toward a PDN. The P-GW 123 may route data packets between the EPC network 123 and external networks such as a network including the application server 130 (alternatively referred to as application function (AF)) via an Internet Protocol (IP) interface 125. Generally, the application server 130 may be an element offering applications that use IP bearer resources with the core network (e.g., UMTS Packet Services (PS) domain, LTE PS data services, etc.). In this embodiment, the P-GW 123 is shown to be communicatively coupled to an application server 130 via an IP communications interface 125. The application server 130 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Enforcement Function (PCRF) 126 is the policy and charging control element of the CN 120. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 126 may be communicatively coupled to the application server 130 via the P-GW 123. The application server 130 may signal the PCRF 126 to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class of identifier (QCI), which commences the QoS and charging as specified by the application server 130.

The eSMLC 127 may be a network element that calculates the location of UEs 101 and 102. The eSMLC may participate in LPP to receive TOA and/or OTDOA data from UEs 101 and 102. Based on this data, the eSMLC 127 may calculate the position (e.g., the geographical position) of UEs 101 and 102. In particular, in one implementation, a UE may measure OTDOA data, and calculate reference signal time differences (RSTDs), from a number of nearby cells. The nearby cells may include a reference cell (e.g., the cell to which the UE is attached) and a number of neighbor cells. The OTDOA/RSTD measurements may be obtained from positioning signals (e.g., a positioning reference signal (PRS)) transmitted by the reference cell and the nearby cells. The RSTD measurements may be reported, by the UEs, to the eSMLC 127, which may calculate the UE position based on the RSTD measurements and the known location of the cells/eNBs.

A number of issues may be encountered to enable mobile positioning for Idle mode UEs, such as Idle mode NB-IoTs. One such issue may relate to the transmission of assistance data to the UE. In existing positioning procedures for Connected mode UEs, eSMLC 127 may send the assistance data to the target UE. The assistance data is carried by a data traffic channel and is only transmitted to the target UE. In IDLE mode, however, the UE is not able to receive unicast data traffic.

A second issue that may be encountered when enabling mobile positioning for Idle mode UEs relates to determination of the measurement period for the positioning measurement. In existing positioning procedures for Connected mode UEs, a UE may perform a positioning measurement when a predetermined positioning signal (e.g. the PRS (positioning reference signal), CRS (cell reference signal), or others) occurs. If the UE is in a discontinuous reception (DRX) status in Connected mode, the UE will also measure the positioning signal regardless of the DRX status. However for NB-IoT UEs in Idle mode, the UE may not be able to measure the positioning signal.

A third issue that may be encountered when enabling mobile positioning for Idle mode UEs relates to ensuring that the UE is able to read the cell system information (SI). In Idle mode, a UE may need to read the cell SI for both serving and neighbor cells for cell reselection or for other mobility purposes. Performing the SI reading may interrupt other UE behaviors, such as paging reception. If the positioning signal reception duration collides with the SI reading duration, the UE might miss this positioning signal, and the positioning period will be extended.

A fourth issue that may be encountered when enabling mobile positioning for Idle mode UEs relates to enhanced cell ID (ECID). In ECID, the UE may report, to eSMLC 127, the serving cell ID, the timing advance (difference between its transmit and receive time), and estimated timing and power of detected neighbor cells. eSMLC 127 may estimate the UE position based on this information and its knowledge of the cells' positions. Existing ECID positioning may require the UE, in Connected mode, to perform measurements on the serving cell and report the measurement results to the network. Since the UE is in Connected mode, it is easy for the network to know which cell is the current serving cell for the target UE. However, in Idle mode, the network may not be aware of which cell is the current serving cell for the target UE.

In a first embodiment, the first issue, mentioned above (transmission of assistance data to the UE), may be addressed. In various implementations, the assistance data may be broadcast to the UE, either in a single time domain piece or in multiple time domain pieces. Because Idle mode UEs can receive broadcast data, the assistance data may be successfully received by the UE.

Figure 2:
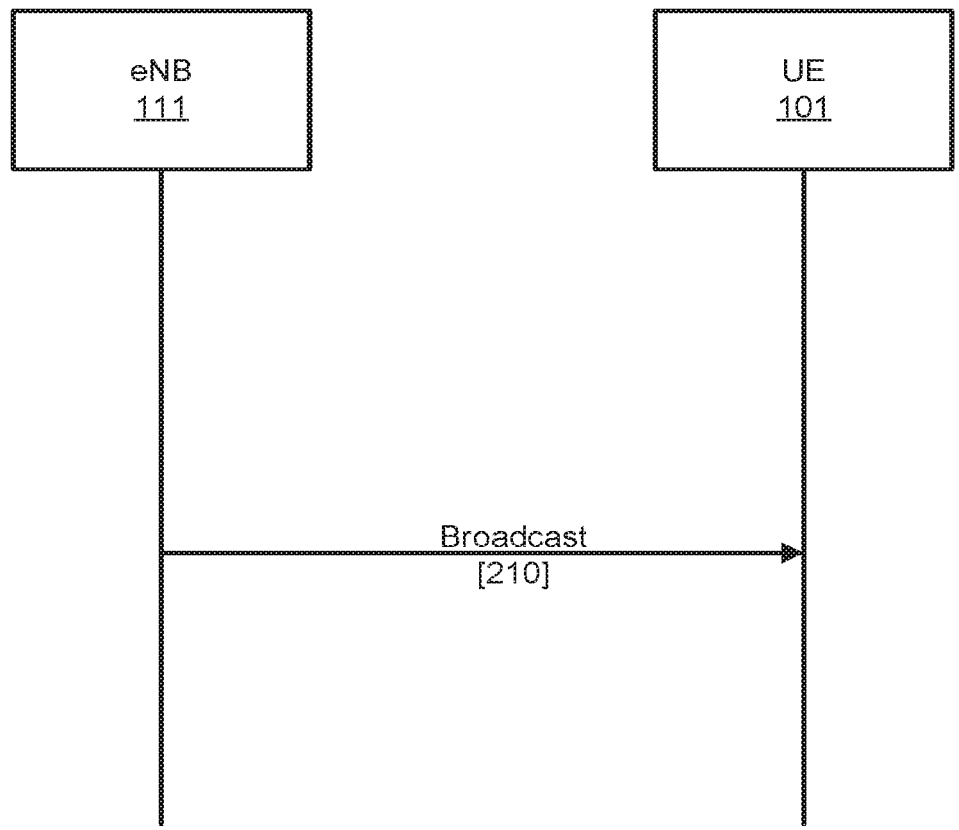
FIG. 2 is a signal diagram illustrating the broadcasting of assistance data, by an evolved NodeB (eNB), to a UE.

FIG. 2 is a signal diagram illustrating the broadcasting of assistance data, by an eNB, to a UE. As shown, the eNB is illustrated as eNB 111 and the UE is illustrated as UE 101.

eNB 111 may broadcast the positioning assistance data to UEs, such as UE 101, in its coverage area (at 210). The assistance data may include, for example, information relating to positioning reference signal timing or sequence, information relating to carrier frequency, etc In the assistance data, the broadcasting cell may be the reference cell for the positioning operation. The assistance data may also include assistance data for any neighbor cells that may potentially be used by UE 101 in the positioning operation. Thus, the broadcast assistance data may include two parts: reference cell information and neighbor cell information. The determination of which cells to include as neighbor cells may be based on, for example, known distance information between eNBs (e.g., any eNB that is potentially in range of another eNB may be included as a possible neighbor cell).

The broadcast assistance data may be triggered or requested by eSMLC 127 via MME 121. For example, eSMLC 127 may send an assistance data broadcasting request to MME 121, and then MME 121 may request all the cells which belong to this MME to broadcast the assistance data.

As an example of the broadcasting of assistance data, assume the existence of two adjacent cells, called "cell1" and "cell2." The assistance data broadcast by cell may include information in which cell1 is the reference cell and cell2 is the neighbor cell. In the assistance data broadcast by cell2, cell2 is included as the reference cell and cell is included as the neighbor cell.

Figure 3A:
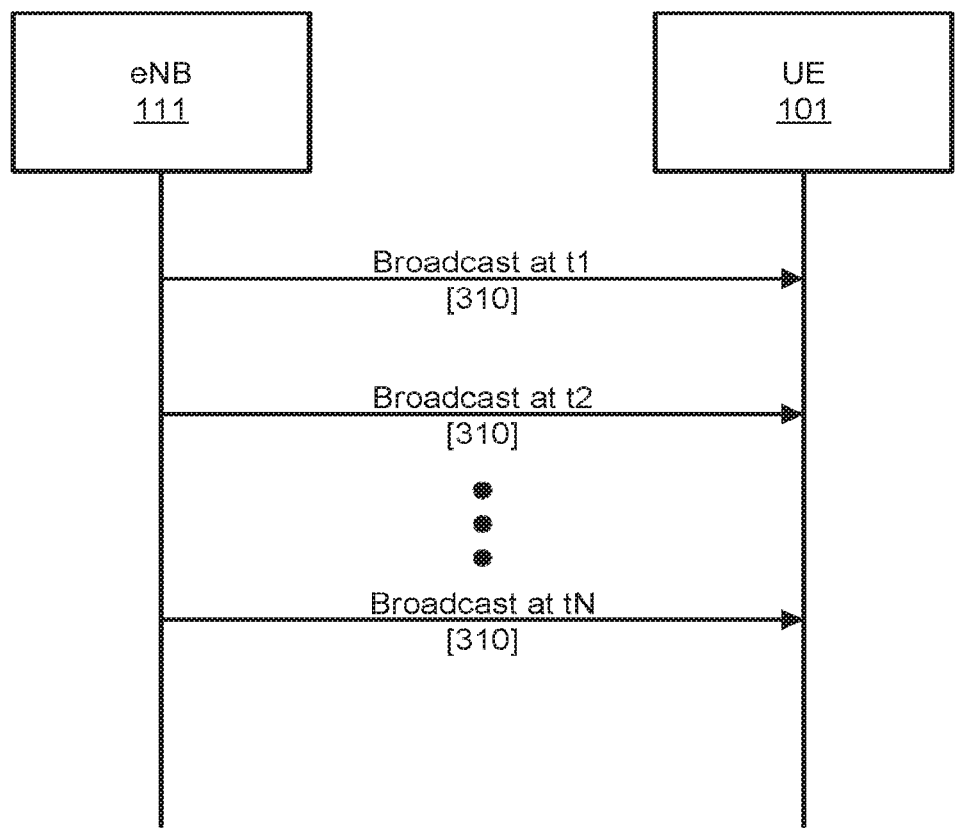
FIG. 3A is a signal diagram illustrating the broadcasting of assistance data, by an eNB, to a UE, as a number of partial pieces.

FIG. 3A is a signal diagram illustrating the broadcasting of assistance data, by an eNB, to a UE, as a number of partial pieces. As shown, the eNB is illustrated as eNB 111 and the UE is illustrated as UE 101. The assistance data may be broadcast in a number of timeslots. In particular, eNB 111 may broadcast the assistance data to UEs, such as UE 101, in its coverage area. As shown in FIG. 3A, the broadcasted assistance data may divided into different pieces/slots, shown as N broadcasts 310 (e.g. in different subframes, different slots, or different symbols). UE 101 may receive and combine these assistance data pieces together to decode the assistance data needed for positioning.

Figure 3B:
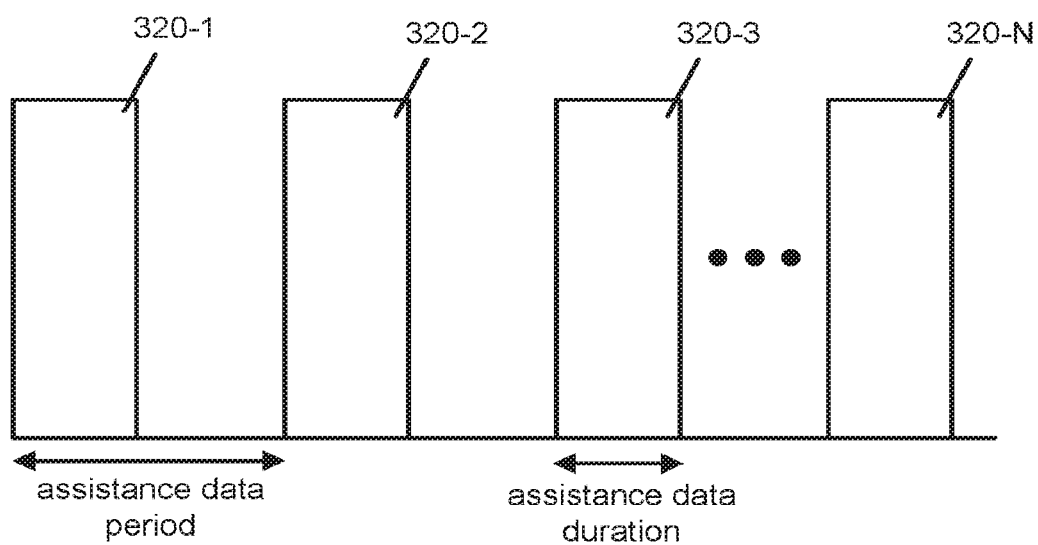
FIG. 3B is a diagram illustrating an example of a timing relationship of multiple assistance data pieces.

FIG. 3B is a diagram illustrating an example of the timing relationship of multiple assistance data pieces. As shown, a number of assistance data pieces 320-1 through 320-N may be periodically broadcast by eNB 111. In some implementations, the period and/or duration of each assistance data piece 320 may be indicated in the first assistance data piece (piece 1). Alternatively or additionally, the period and/or duration of the assistance data pieces may be indicated in a system information message (e.g., Master Information Block (MIB), System Information Block (SIB), or others) of the cell that is broadcasting the assistance data.

In another embodiment, relating to the first issue mentioned above, the assistance data may be transmitted as paging data. For example, all cells within the same tracking area may transmit the assistance data within paging messages.

Figure 4:
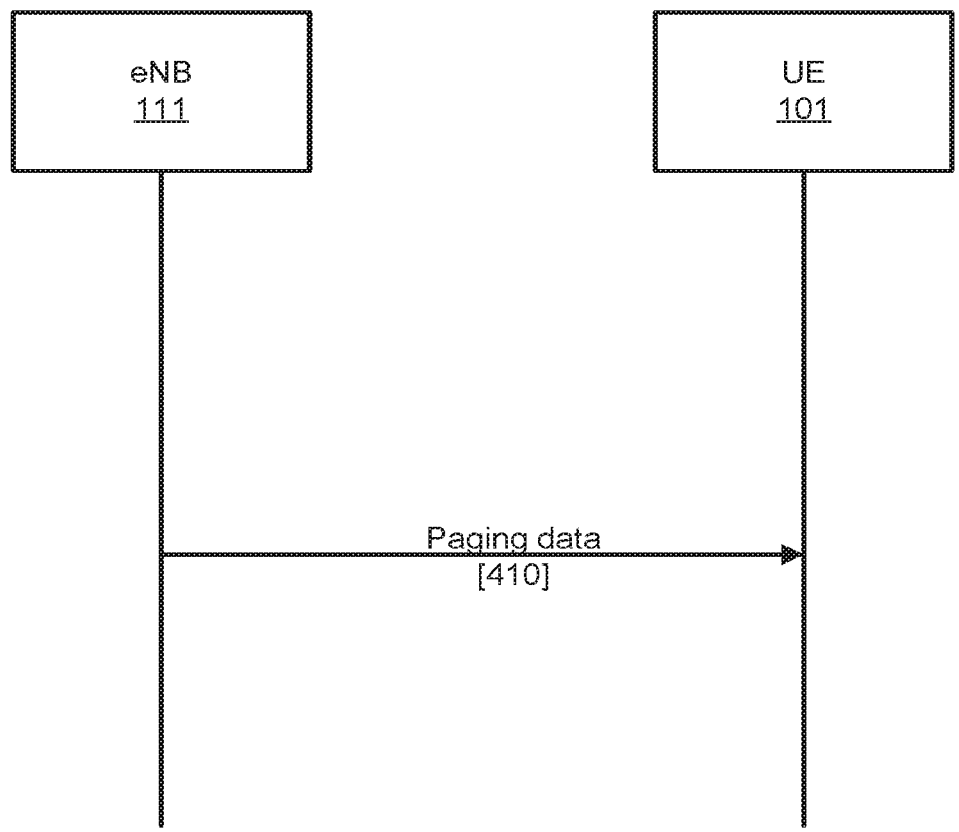
FIG. 4 is a signal diagram illustrating the broadcasting of assistance data, via paging, by an eNB, to a UE.

FIG. 4 is a signal diagram illustrating the broadcasting of assistance data, via paging, by an eNB, to a UE. As shown, the eNB is illustrated as eNB 111 and the UE is illustrated as UE 101.

eNB 111 may transmit paging messages that include positioning assistance data to UEs, such as UE 101 (at 410, "paging data"). The assistance data, transmitted via paging, may include the assistance data for all of the cells in the tracking area. That is, the assistance data may be the combined assistance data of all the cells in the tracking area.

The transmitted assistance data may be triggered or requested by eSMLC 127 via MME 121. For example, eSMLC 127 may send an assistance data paging request to MME 121, and then MME 121 may request all the cells which belong to this MME to transmit, via paging messages, the assistance data.

As an example of the transmission of assistance data via paging, assume that two adjacent cells, called "cell1" and "cell2," belong to the same MME 121. Cell1 and cell2 may transmit the assistance data via paging, and the transmitted assistance data may be the same for both cells. Additionally, any other cells in the same tracking area as cell1 and cell2 may also transmit, via paging, the same assistance data.

Figure 5A:
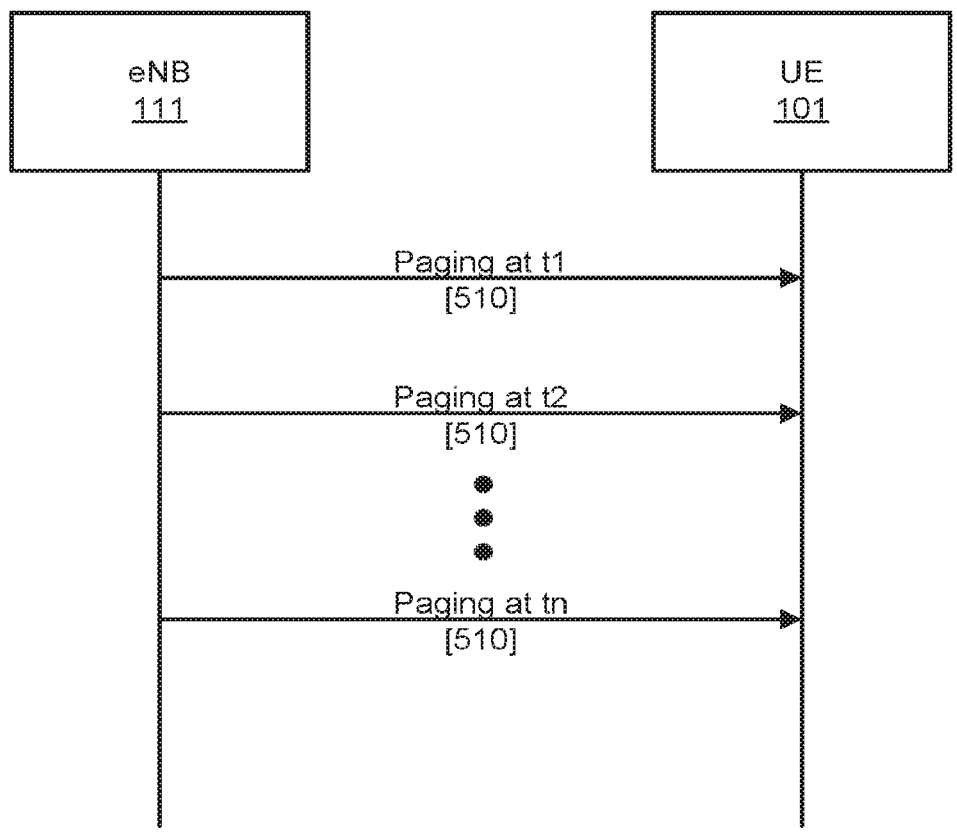
FIG. 5A is a signal diagram illustrating the transmission of assistance data, by an eNB, to a UE.

FIG. 5A is a signal diagram illustrating the transmission of assistance data, by an eNB, to a UE In FIG. 5A, the assistance data may be transmitted, via paging, in a number of timeslots. In particular, the assistance data may be divided into different paging messages and transmitted in different messages. UE 101 may receive and combine the different paging messages to decode the assistance data. In a manner similar to that discussed previous with respect to dividing the broadcast assistance data into multiple pieces, the paging assistance data may divided into N paging messages 510.

Figure 5B:
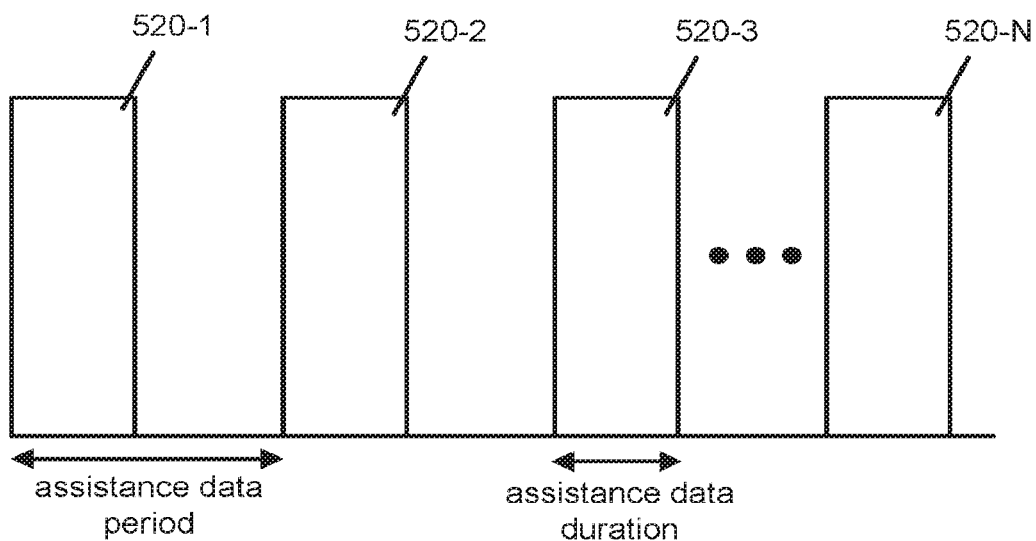
FIG. 5B is a diagram illustrating an example of the timing relationship of multiple paging assistance data messages. As shown, a number of paging assistance data pieces 520-1 through 520-N

FIG. 5B is a diagram illustrating an example of the timing relationship of multiple paging assistance data messages. As shown, a number of paging assistance data pieces 520-1 through 520-N may be transmitted by eNB 111. In some implementations, the period and/or duration of each assistance data piece 520 may be indicated in the first assistance data paging message (piece 1). Alternatively or additionally, the period and/or duration of the assistance data pieces may be indicated in system information (e.g., Master MIB, SIB, SIB1, or others) of the cell that is paging the UE with assistance data.

In another embodiment, the second issue, mentioned above, relating to the determination of the measurement period for the positioning measurement during Idle mode, may be addressed. In one implementation, UE 101 may only measure the positioning signal during the DRX occasions. In another implementation, UE 101 may measure all the positioning signals, regardless of the scheduled DRX occasions.

Figure 6:
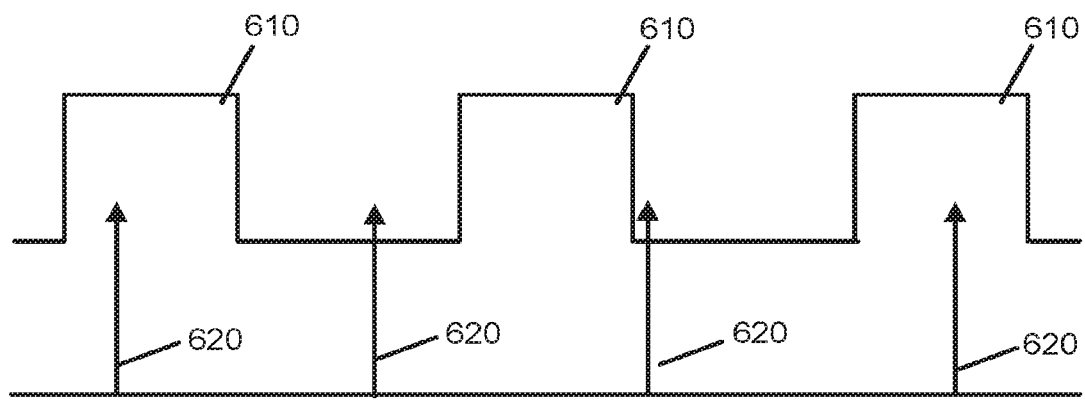
FIG. 6 is a diagram illustrating an example timing of DRX occasions and positioning signals.

In Idle mode, a UE typically only transmits or receives data during defined occasions (the DRX occasions). Outside of the DRX occasions, the UE may turn off its radios to conserve power. FIG. 6 is a diagram illustrating an example timing of DRX occasions and positioning signals.

As illustrated in FIG. 6, a number of DRX occasions (periods) 610 are illustrated. Periodic positioning signals 620 may be transmitted by eNBs 111. Some of positioning signals 620 may overlap with a DRX occasion 610, while other ones of the positioning signals 620 do not overlap.

In one implementation, UE 101 may perform positioning measurements (i.e., measuring positioning signals 620) only during the DRX occasions 610. Outside of DRX occasions 610, the UE 101 may remain in a low-power state and not measure the positioning signals 620. In FIG. 6, UE 101 may thus only perform the positioning measurements in the first and third DRX occasions. In this implementation, the positioning measurement period requirement may be defined as N*T, where N is the number of positioning signal samples that need to be decoded for a positioning measurement, and T is the lower common multiple (LCM) of the DRX cycle and the positioning signal periodicity.

In another implementation, UE 101 may measure positioning signals 620 regardless of whether a DRX occasion is occurring (i.e., the UE may active its radio even when not in a DRX occasion). In this implementation, the positioning measurement period requirement may be defined as N*T', where N is the amount of positioning signal (e.g., position reference signals) samples that need to be decoded for a positioning measurement, and T' is the time interval between two adjacent available positioning signal samples.

In a third embodiment, the third issue, mentioned above, relating to the reading of the cell system information, may be addressed. As mentioned, in Idle mode, a UE may need to read the cell SI for both serving and neighbor cells for cell reselection or for other mobility purposes. Performing the SI reading may interrupt other UE behaviors, such as paging reception. If the positioning signal reception duration collides with the SI reading duration, the UE might miss this positioning signal, causing the positioning period to be extended.

In one implementation, a UE in Idle mode may prioritize reading of the cell SI over positioning measurements. The total period for a positioning measurement may thus be extended when some of the positioning measurement or positioning signals overlap with the neighbor or serving cell ST transmissions in the time domain In this situation, UE 101, when performing a positioning measurement, may extend the positioning measurement period by the number of expected overlapping positioning signal and SI transmissions. As an example of this, assume UE 101 needs X positioning signal samples to successfully decode the positioning signal, the positioning signal periodicity is $T_p$, and Y positioning samples of the X positioning samples overlap with neighbor or serving cell SI readings. UE 101, when performing a single positioning measurement, may thus make the total positioning measurement over a period that is equal to $X*T_p+Y*Tp$.

In another possible implementation, a UE in Idle mode may deprioritize reading of the cell SI over positioning measurements. The total period for the cell SI reading may thus be extended instead of extending the period for the positioning measurement signal. In this situation, UE 101, when performing a cell SI reading, may extend the cell SI reading period by the number of expected overlapping positioning signals and SI transmissions. As an example of this, assume UE 101 needs X cell SI readings to successfully decode the SI, the cell SI periodicity is $T_p$, and Y SI samples of the X SI readings overlap with positioning signals. UE 101, when performing a cell SI reading, may thus make the total SI reading over a period that is equal to $X*T_p+Y*Tp$.

In a fourth embodiment, the fourth issue, mentioned above, relating to the determination of the current cell of a UE, when in Idle mode, may be addressed. As mentioned, for an Idle mode UE, the network may not be aware of which cell is the current serving cell (i.e., the reference cell) for the UE. Accordingly, eSMLC 127 may not know which eNB 111 to contact to request a positioning measurement (i.e., to request that the UE perform a Rx-Tx time difference measurement and report the results to eSMLC 127).

Figure 7:
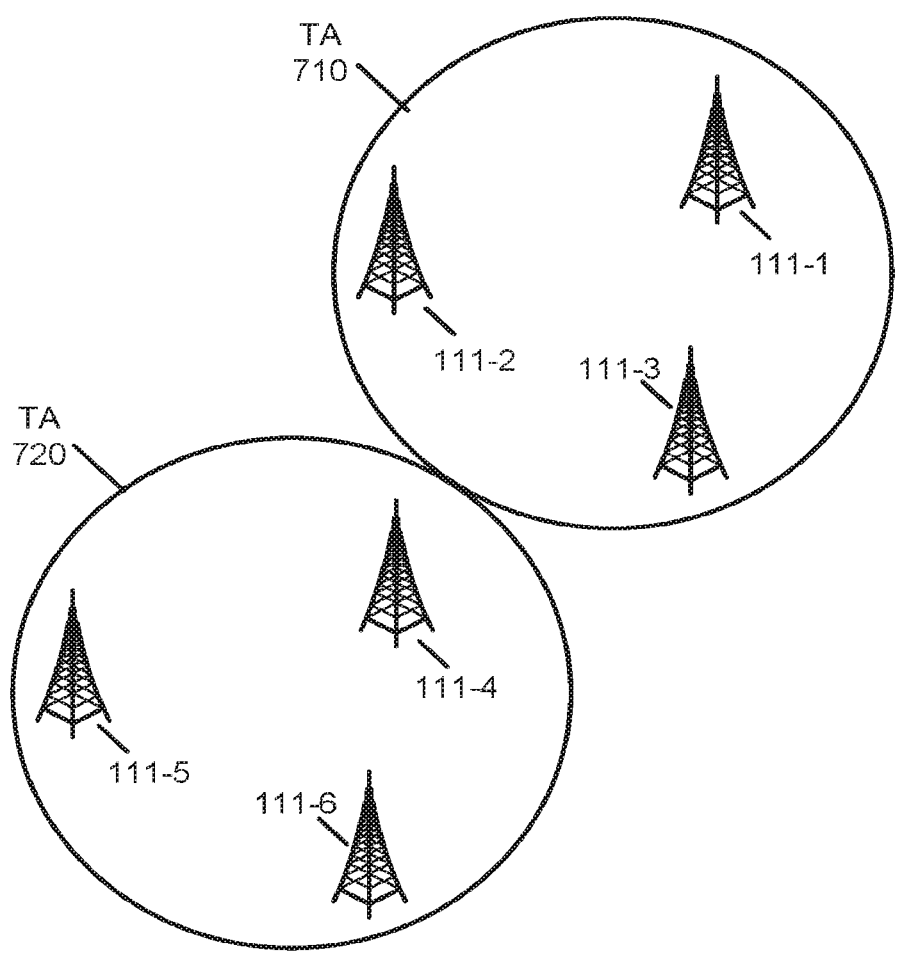
FIG. 7 is a diagram illustrating an example of a UE associated with a tracking area (TA)

FIG. 7 is a diagram illustrating an example of a UE associated with a tracking area (TA). As shown, the RAN portion of a network may include a number of eNBs. The network operator may logically group the eNBs into groups, called tracking areas, and illustrated as TA 710 and TA 720. TA 710 is illustrated as including eNBs 111-1, 111-2, and 111-3, and TA 720 is illustrated as including eNBs 111-4, 111-5, and 111-6. In this example, assume each eNB is associated with a single cell. When UE 101 is in an active state, its location may be known by the network at the eNB/cell level. However, when the UE is in an Idle state, the location of the UE may be known by the network only at the TA level.

In one implementation relating to the fourth embodiment, eSMLC 127, when submitting an eNB Rx-TX time difference measurement request (i.e., a request for a UE to perform a position measurement), eSMLC 127 may transmit the request to all of the eNBs 111 that are associated with the TA of the UE. For example, if the UE is currently in TA 710, eSMLC 127 may transmit the eNB Rx-TX time difference measurement request to each of eNBs 111-1, 111-2, and 111-3. Each of eNBs 111-1, 111-2, and 111-3 may subsequently attempt to trigger UE 101 to perform position measurement. UE 101, after performing the position measurement, may report the eNB Rx-TX time difference measurement via the RACH (Random Access Channel). The cells that successfully receive and decode the RACH, from UE 101, may report the eNB Rx-TX time difference measurements to eSMLC 127. The report to eSMILC 127 may include an indication of the PCI (physical cell identifier). eSMLC 127 may, based on the PCI and corresponding reported eNB Rx-Tx and UE Rx-Tx measurement results, derive the round trip time.

In another implementation relating to the fourth embodiment, UE 101 may report, in an ECID positioning capability message, the service cell information (e.g., the PCI) to eSMLC 127. The service cell may be defined as the cell at which the UE perform the UE Rx-Tx time difference measurement.

As used herein, the term "circuitry," "processing circuitry," or "logic" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 8:
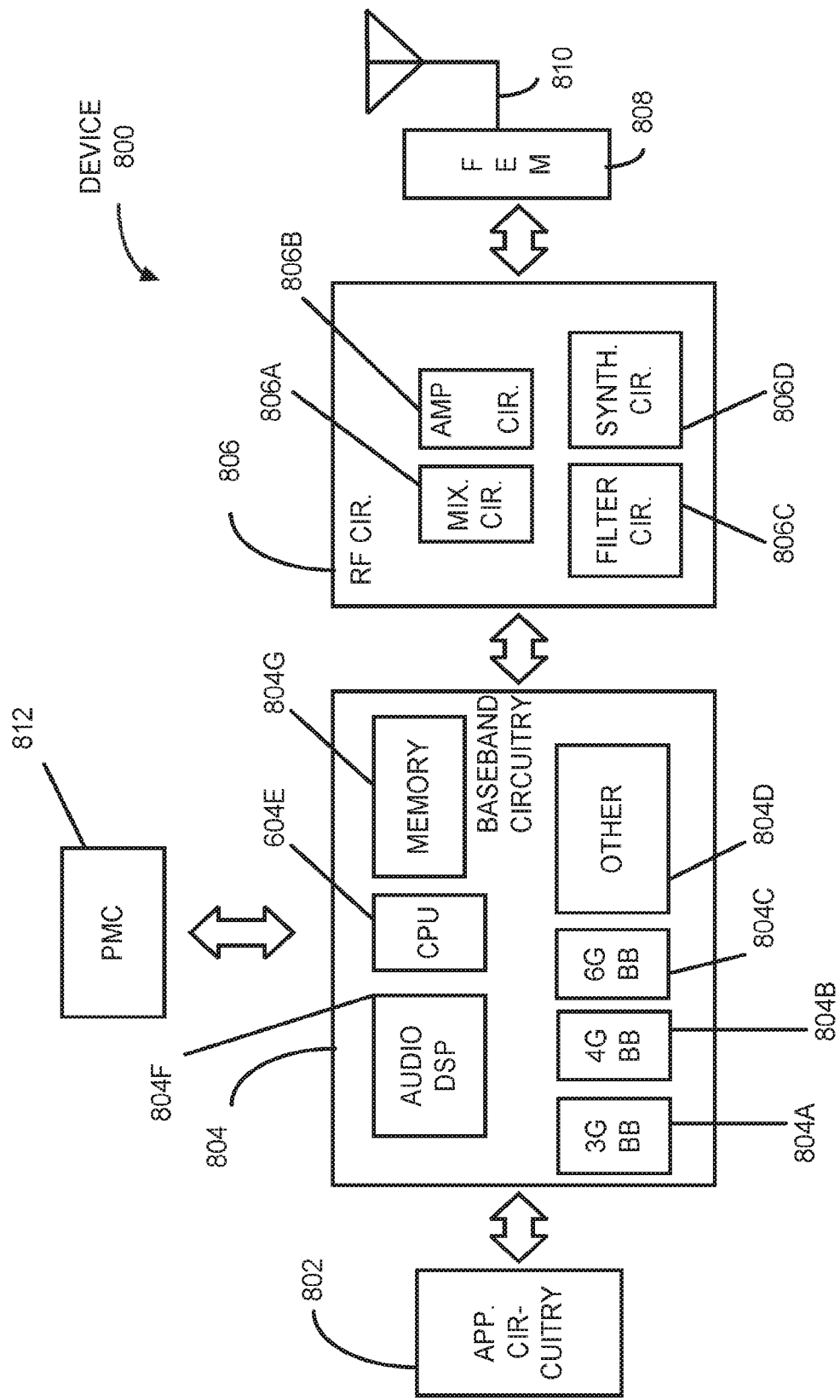
FIG. 8 illustrates example components of a device in accordance with some embodiments.

FIG. 8 illustrates example components of a device 800 in accordance with some embodiments. In some embodiments, the device 800 may include application circuitry 802, baseband circuitry 804, Radio Frequency (RF) circuitry 806, front-end module (FEM) circuitry 808, one or more antennas 810, and power management circuitry (PMC) 812 coupled together at least as shown. The components of the illustrated device 800 may be included in a UE or a RAN node. In some embodiments, the device 800 may include less elements (e.g., a RAN node may not utilize application circuitry 802, and instead include a processor/controller to process IP data received from an EPC). In some embodiments, the device 800 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 802 may include one or more application processors. For example, the application circuitry 802 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 800. In some embodiments, processors of application circuitry 802 may process IP data packets received from an EPC.

The baseband circuitry 804 may include circuitry such as, but not limited to, one or more single-core or multi-core processors. The baseband circuitry 804 may include one or more baseband processors or control logic to process baseband signals received from a receive signal path of the RF circuitry 806 and to generate baseband signals for a transmit signal path of the RF circuitry 806. Baseband processing circuitry 804 may interface with the application circuitry 802 for generation and processing of the baseband signals and for controlling operations of the RF circuitry 806. For example, in some embodiments, the baseband circuitry 804 may include a third generation (3G) baseband processor 804A, a fourth generation (4G) baseband processor 804B, a fifth generation (5G) baseband processor 804C, or other baseband processor(s) 804D for other existing generations, generations in development or to be developed in the future (e.g., second generation (2G), sixth generation (6G), etc). The baseband circuitry 804 (e.g., one or more of baseband processors 804A-D) may handle various radio control functions that enable communication with one or more radio networks via the RF circuitry 806. In other embodiments, some or all of the functionality of baseband processors 804A-D may be included in modules stored in the memory 804G and executed via a Central Processing Unit (CPU) 804E. The radio control functions may include, but are not limited to, signal modulation/demodulation, encoding/decoding, radio frequency shifting, etc. In some embodiments, modulation/demodulation circuitry of the baseband circuitry 804 may include Fast-Fourier Transform (FFT), precoding, or constellation mapping/demapping functionality. In some embodiments, encoding/decoding circuitry of the baseband circuitry 804 may include convolution, tail-biting convolution, turbo, Viterbi, or Low-Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 804 may include one or more audio digital signal processor(s) (DSP) 804F. The audio DSP(s) 804F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 804 and the application circuitry 802 may be implemented together such as, for example, on a system on a chip (SOC).

In some embodiments, the baseband circuitry 804 may provide for communication compatible with one or more radio technologies. For example, in some embodiments, the baseband circuitry 804 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 804 is configured to support radio communications of more than one wireless protocol may be referred to as multi-mode baseband circuitry.

RF circuitry 806 may enable communication with wireless networks using modulated electromagnetic radiation through a non-solid medium. In various embodiments, the RF circuitry 806 may include switches, filters, amplifiers, etc. to facilitate the communication with the wireless network. RF circuitry 806 may include a receive signal path which may include circuitry to down-convert RF signals received from the FEM circuitry 808 and provide baseband signals to the baseband circuitry 804 RF circuitry 806 may also include a transmit signal path which may include circuitry to up-convert baseband signals provided by the baseband circuitry 804 and provide RF output signals to the FEM circuitry 808 for transmission.

In some embodiments, the receive signal path of the RF circuitry 806 may include mixer circuitry 806a, amplifier circuitry 806b and filter circuitry 806c. In some embodiments, the transmit signal path of the RF circuitry 806 may include filter circuitry 806c and mixer circuitry 806a. RF circuitry 806 may also include synthesizer circuitry 806d for synthesizing a frequency for use by the mixer circuitry 806a of the receive signal path and the transmit signal path. In some embodiments, the mixer circuitry 806a of the receive signal path may be configured to down-convert RF signals received from the FEM circuitry 808 based on the synthesized frequency provided by synthesizer circuitry 806d. The amplifier circuitry 806b may be configured to amplify the down-converted signals and the filter circuitry 806c may be a low-pass filter (LPF) or band-pass filter (BPF) configured to remove unwanted signals from the down-converted signals to generate output baseband signals. Output baseband signals may be provided to the baseband circuitry 804 for further processing. In some embodiments, the output baseband signals may be zero-frequency baseband signals, although this is not a requirement. In some embodiments, mixer circuitry 806a of the receive signal path may comprise passive mixers, although the scope of the embodiments is not limited in this respect.

In some embodiments, the mixer circuitry 806a of the transmit signal path may be configured to up-convert input baseband signals based on the synthesized frequency provided by the synthesizer circuitry 806d to generate RF output signals for the FEM circuitry 808. The baseband signals may be provided by the baseband circuitry 804 and may be filtered by filter circuitry 806c.

In some embodiments, the mixer circuitry 806a of the receive signal path and the mixer circuitry 806a of the transmit signal path may include two or more mixers and may be arranged for quadrature downconversion and upconversion, respectively. In some embodiments, the mixer circuitry 806a of the receive signal path and the mixer circuitry 806a of the transmit signal path may include two or more mixers and may be arranged for image rejection (e.g., Hartley image rejection). In some embodiments, the mixer circuitry 806a of the receive signal path and the mixer circuitry 806a may be arranged for direct downconversion and direct upconversion, respectively. In some embodiments, the mixer circuitry 806a of the receive signal path and the mixer circuitry 806a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 806 may include analog-to-digital converter (ADC) and digital-to-analog converter (DAC) circuitry and the baseband circuitry 804 may include a digital baseband interface to communicate with the RF circuitry 806.

In some dual-mode embodiments, a separate radio IC circuitry may be provided for processing signals for each spectrum, although the scope of the embodiments is not limited in this respect.

In some embodiments, the synthesizer circuitry 806d may be a fractional-N synthesizer or a fractional N/N+1 synthesizer, although the scope of the embodiments is not limited in this respect as other types of frequency synthesizers may be suitable. For example, synthesizer circuitry 806d may be a delta-sigma synthesizer, a frequency multiplier, or a synthesizer comprising a phase-locked loop with a frequency divider.

The synthesizer circuitry 806d may be configured to synthesize an output frequency for use by the mixer circuitry 806a of the RF circuitry 806 based on a frequency input and a divider control input. In some embodiments, the synthesizer circuitry 806d may be a fractional N/N+1 synthesizer.

In some embodiments, frequency input may be provided by a voltage controlled oscillator (VCO), although that is not a requirement. Divider control input may be provided by either the baseband circuitry 804 or the applications processor 802 depending on the desired output frequency. In some embodiments, a divider control input (e.g., N) may be determined from a look-up table based on a channel indicated by the applications processor 802.

Synthesizer circuitry 806d of the RF circuitry 806 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 806d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 806 may include an IQ/polar converter.

FEM circuitry 808 may include a receive signal path which may include circuitry configured to operate on RF signals received from one or more antennas 810, amplify the received signals and provide the amplified versions of the received signals to the RF circuitry 806 for further processing. FEM circuitry 808 may also include a transmit signal path which may include circuitry configured to amplify signals for transmission provided by the RF circuitry 806 for transmission by one or more of the one or more antennas 810. In various embodiments, the amplification through the transmit or receive signal paths may be done solely in the RF circuitry 806, solely in the FEM 808, or in both the RF circuitry 806 and the FEM 808.

In some embodiments, the FEM circuitry 808 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 806). The transmit signal path of the FEM circuitry 808 may include a power amplifier (PA) to amplify input RF signals (e.g., provided by RF circuitry 806), and one or more filters to generate RF signals for subsequent transmission (e.g., by one or more of the one or more antennas 810).

In some embodiments, the PMC 812 may manage power provided to the baseband circuitry 804. In particular, the PMC 812 may control power-source selection, voltage scaling, battery charging, or DC-to-DC conversion. The PMC 812 may often be included when the device 800 is capable of being powered by a battery, for example, when the device is included in a UE. The PMC 812 may increase the power conversion efficiency while providing desirable implementation size and heat dissipation characteristics.

While FIG. 8 shows the PMC 812 coupled only with the baseband circuitry 804. However, in other embodiments, the PMC 812 may be additionally or alternatively coupled with, and perform similar power management operations for, other components such as, but not limited to, application circuitry 802, RF circuitry 806, or FEM 808.

In some embodiments, the PMC 812 may control, or otherwise be part of, various power saving mechanisms of the device 800. For example, if the device 800 is in an RRC_Connected state, where it is still connected to the RAN node as it expects to receive traffic shortly, then it may enter a state known as Discontinuous Reception Mode (DRX) after a period of inactivity.

During this state, the device 800 may power down for brief intervals of time and thus save power.

If there is no data traffic activity for an extended period of time, then the device 800 may transition off to an RRC_Idle state, where it disconnects from the network and does not perform operations such as channel quality feedback, handover, etc. The device 800 goes into a very low power state and it performs paging where again it periodically wakes up to listen to the network and then powers down again. The device 800 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 802 and processors of the baseband circuitry 804 may be used to execute elements of one or more instances of a protocol stack. For example, processors of the baseband circuitry 804, alone or in combination, may be used execute Layer 3, Layer 2, or Layer 1 functionality, while processors of the application circuitry 804 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 9:
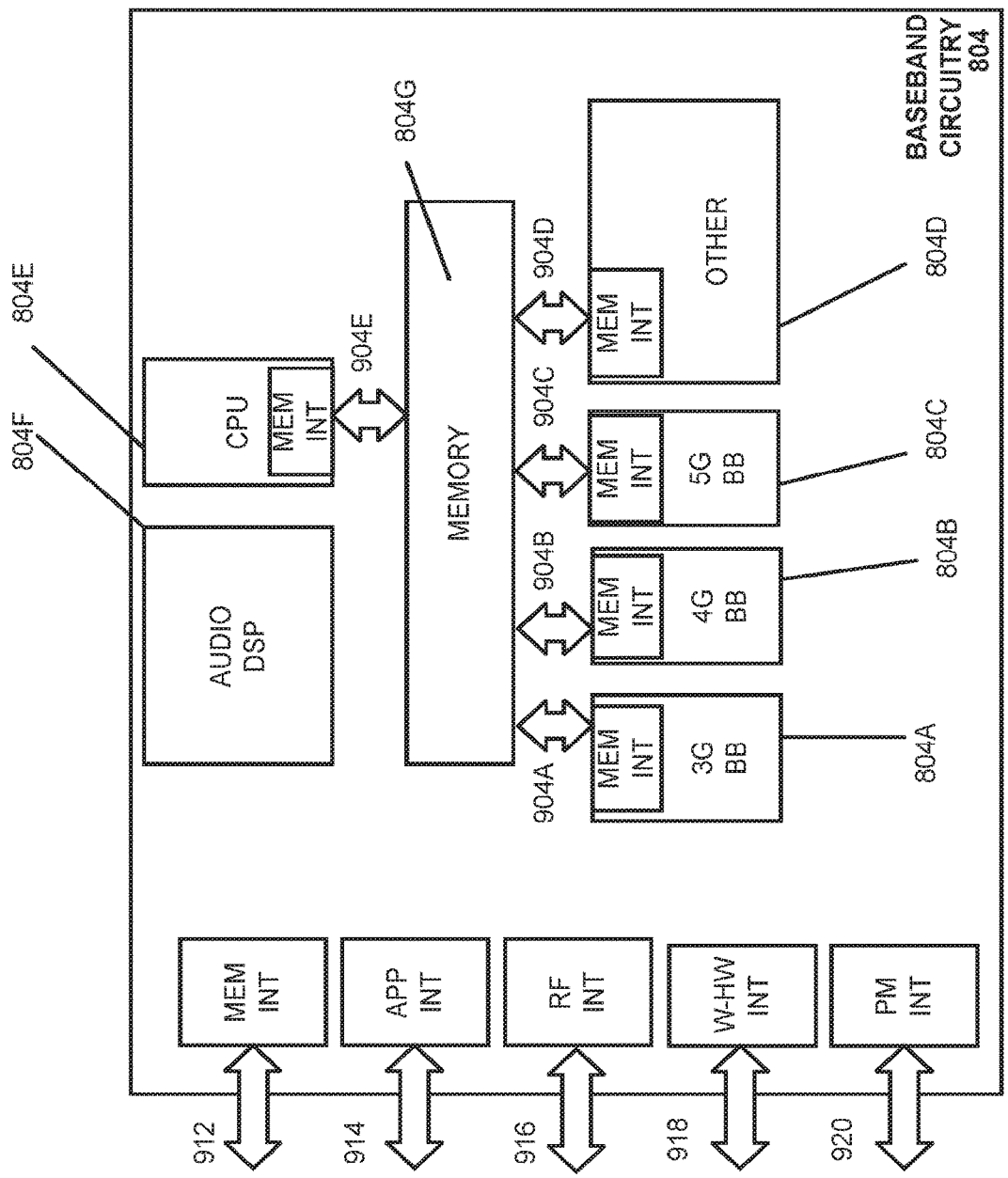
FIG. 9 illustrates example interfaces of baseband circuitry in accordance with some embodiments.

FIG. 9 illustrates example interfaces of baseband circuitry in accordance with some embodiments. As discussed above, the baseband circuitry 804 of FIG. 8 may comprise processors 804A-504E and a memory 804G utilized by said processors. Each of the processors 804A-504E may include a memory interface, 904A-604E, respectively, to send/receive data to/from the memory 804G.

The baseband circuitry 804 may further include one or more interfaces to communicatively couple to other circuitries/devices, such as a memory interface 912 (e.g., an interface to send/receive data to/from memory external to the baseband circuitry 804), an application circuitry interface 914 (e.g., an interface to send/receive data to/from the application circuitry 802 of FIG. 8), an RF circuitry interface 916 (e.g., an interface to send/receive data to/from RF circuitry 806 of FIG. 8), a wireless hardware connectivity interface 918 (e.g., an interface to send/receive data to/from Near Field Communication (NFC) components, Bluetooth® components (e.g., Bluetooth® Low Energy), Wi-Fi® components, and other communication components), and a power management interface 920 (e.g., an interface to send/receive power or control signals to/from the PMC 812. RF circuitry interface 916 may particularly include a first interface to a radio designed to communicate via an LTE link and a second interface to a radio designed to communicate via a WLAN (e.g., WiFi) link.

Figure 10:
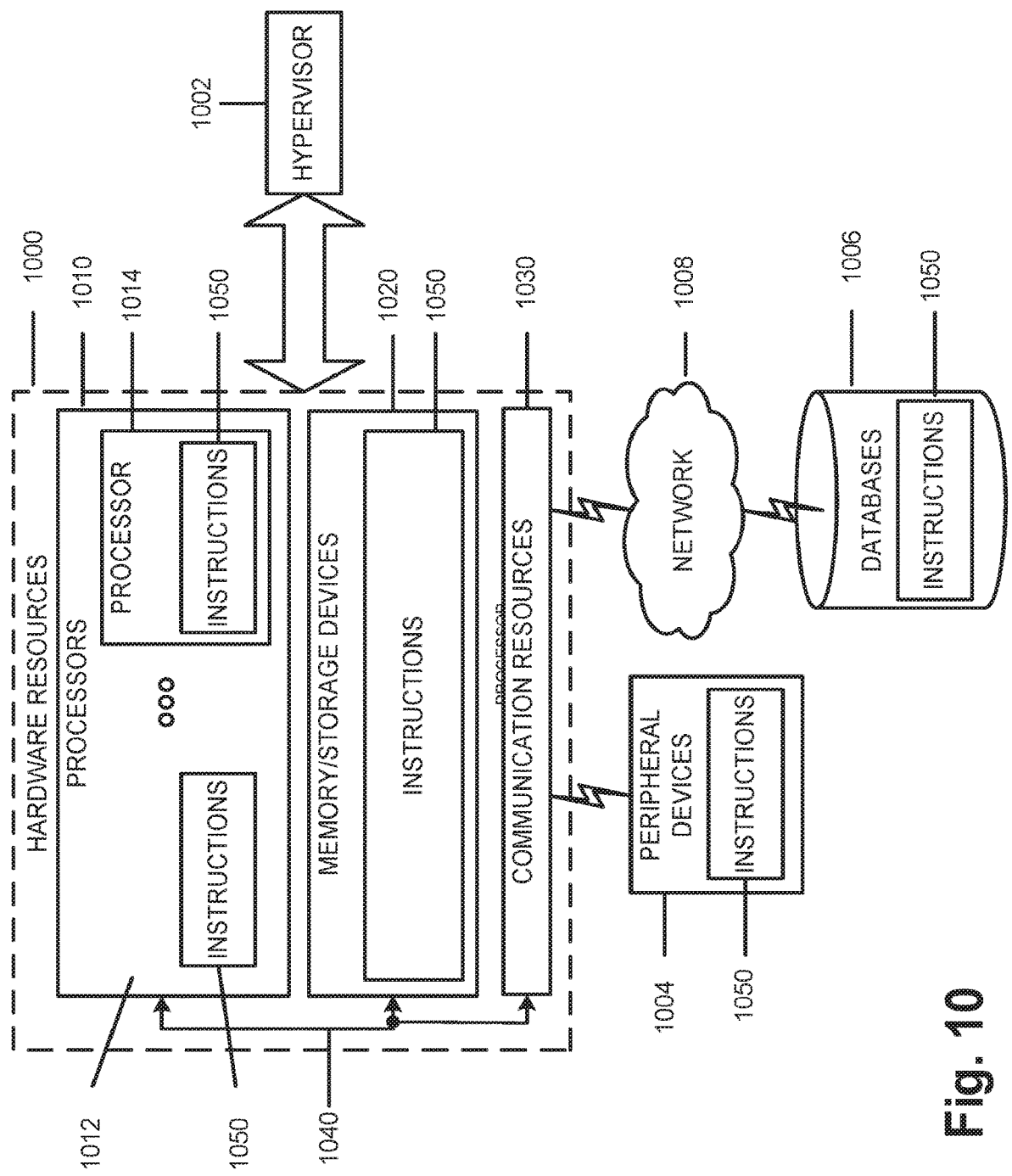
FIG. 10 is a block diagram illustrating components, according to some example embodiments, able to read instructions from a machine-readable or computer-readable medium (e.g., a non-transitory machine-readable storage medium) and perform any one or more of the methodologies discussed herein.

FIG. 10 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 10 shows a diagrammatic representation of hardware resources 1000 including one or more processors (or processor cores) 1010, one or more memory/storage devices 1020, and one or more communication resources 1030, each of which may be communicatively coupled via a bus 1040. For embodiments where node virtualization (e.g., NFV) is utilized, a hypervisor 1002 may be executed to provide an execution environment for one or more network slices/sub-slices to utilize the hardware resources 1000

The processors 1010 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1012 and a processor 1014.

The memory/storage devices 1020 may include main memory, disk storage, or any suitable combination thereof. The memory/storage devices 1020 may include, but are not limited to any type of volatile or non-volatile memory such as dynamic random-access memory (DRAM), static random-access memory (SRAM), erasable programmable read-only memory (EPROM), electrically erasable programmable read-only memory (EEPROM), Flash memory, solid-state storage, etc.

The communication resources 1030 may include interconnection or network interface components or other suitable devices to communicate with one or more peripheral devices 1004 or one or more databases 1006 via a network 1008. For example, the communication resources 1030 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1050 may comprise software, a program, an application, an applet, an app, or other executable code for causing at least any of the processors 1010 to perform any one or more of the methodologies discussed herein. The instructions 1050 may reside, completely or partially, within at least one of the processors 1010 (e.g., within the processor's cache memory), the memory/storage devices 1020, or any suitable combination thereof. Furthermore, any portion of the instructions 1050 may be transferred to the hardware resources 1000 from any combination of the peripheral devices 1004 or the databases 1006. Accordingly, the memory of processors 1010, the memory/storage devices 1020, the peripheral devices 1004, and the databases 1006 are examples of computer-readable and machine-readable media.

A number of examples, relating to implementations of the techniques described above, will next be given.

In a first example, an apparatus of a baseband processor for User Equipment (UE) may comprise an interface to radio circuitry, for a cellular wireless network including a plurality of evolved NodeBs (eNBs); and one or more processors to: process, via the interface to radio circuitry, Observed Time Difference Of Arrival (OTDOA) assistance data from the eNBs; control, via the interface to the radio circuitry and based on the assistance data, obtaining of position reference signals (PRS) measurements for a plurality of cells associated with the plurality of eNBs, including a reference cell of the UE, over a position measuring period defined based on a product of: a specified amount of samples of the PRS, a period of the PRS; process the PRS measurements to obtain Reference Signal Time Differences (RSTDs) for the plurality of cells; and report the measured RSTD values to at least one of the eNBs.

In example 2, the subject matter of example 1, or any of the examples herein, wherein the OTDOA assistance data is received while in an Idle state of the UE.

In example 3, the subject matter of example 1 or 2, or any of the examples herein, wherein the assistance data is received as broadcast data from the eNBs.

In example 4, the subject matter of example 1 or 2, or any of the examples herein, the assistance data is received as part of a paging message.

In example 5, the subject matter of example 1 or 2, or any of the examples herein, wherein the one or more processors are further to: control the obtaining of the measurements only during a discontinuous reception (DRX) period of the UE.

In example 6, the subject matter of example 1, or any of the examples herein, wherein the one or more processors are further to: prioritize reading of system information (SI) over the obtaining of the measurements In example 7, the subject matter of example 1, or any of the examples herein, wherein the one or more processors are further to: prioritize reading of the measurements over reading of system information (SI).

In example 8, the subject matter of example 1, 6, or 7, or any of the examples herein, wherein the UE is a narrowband Internet-of-Things (NB-IoT) device.

In a ninth example, an apparatus including User Equipment (UE) may comprise a computer-readable medium containing program instructions; and one or more processors to execute the program instructions to: process Observed Time Difference Of Arrival (OTDOA) assistance data from evolved NodeBs (eNBs), of a cellular wireless network, that are each associated with one or more cells; control, based on the assistance data and while the UE is in an Idle state, obtaining of position reference signals (PRS) measurements for a plurality of cells, including a reference cell of the UE, over a position measuring period defined based on a product of: a specified amount of samples of the PRS, and a period of the PRS; process the PRS measurements to obtain Reference Signal Time Differences (RSTDs) values for the plurality of cells; generate a report, including the RSTD values; and control transmitting of the report to at least one of the eNBs.

In example 10, the subject matter of example 9, or any of the examples herein, wherein the OTDOA assistance data is received as broadcast data from the eNBs.

In example 11, the subject matter of example 9, or any of the examples herein, wherein the assistance data is received as part of a paging message.

In example 12, the subject matter of example 9 or 10, or any of the examples herein, wherein the one or more processors are further to: control the obtaining of the measurements only during a discontinuous reception (DRX) period of the UE.

In example 13, the subject matter of example 9, or any of the examples herein, wherein the one or more processors are further to: prioritize reading of system information (SI) over the obtaining of the measurements.

In example 14, the subject matter of example 9, or any of the examples herein, wherein the one or more processors are further to: prioritize reading of the measurements over reading system information (SI).

In example 15, the subject matter of example 9, 10, 12, 13, or 14 or any of the examples herein, wherein the UE is a narrowband Internet-of-Things (NB-IoT) device.

In a 16$^{th}$ example, a computer readable medium containing program instructions for causing a device to perform the method of: control, based on the assistance data and while the UE is in Idle mode, obtaining of position reference signals (PRS) measurements for a plurality of cells, including a reference cell of the UE, over a position measuring period defined based on a product of: a specified amount of samples of the PRS, and a period of the PRS; process the PRS measurements to obtain Reference Signal Time Differences (RSTDs) values for the plurality of cells: generate a report, including the RSTD values; and control transmitting of the report to at least one of the eNBs.

In example 17, the subject matter of example 16, or any of the examples herein, wherein the assistance data is received in an Idle state of the UE.

In example 18, the subject matter of example 17, or any of the examples herein, wherein the assistance data is received as broadcast data from the eNBs.

In example 19, the subject matter of example 17, or any of the examples herein, wherein the assistance data is received as part of a paging message.

In example 20, the subject matter of example 16, or any of the examples herein, wherein the program instructions further cause the device to: control the obtaining of the measurements only during a discontinuous reception (DRX) period of the UE.

In example 21, the subject matter of example 16, or any of the examples herein, wherein the program instructions further cause the device to: prioritize reading of system information (SI) over the obtaining of the measurements.

In a 22$^{nd}$ example, a device comprises: means for processing Observed Time Difference Of Arrival (OTDOA) assistance data from at least one evolved NodeB (eNB) of a plurality of eNBs associated with a cellular network, means for controlling, based on the assistance data, obtaining of measurements of position reference signals (PRS) for a plurality of cells associated with the plurality of eNBs, including a reference cell of the UE, over a position measuring period defined based on a product of: a specified amount of samples of the PRS, a period of the PRS; means for processing the PRS measurements to obtain Reference Signal Time Differences (RSTDs) for the plurality of cells; and means for reporting the measured RSTD values to at least one of the eNBs.

In example 23, the subject matter of example 22 or any of the examples herein, wherein the OTDOA assistance data is received while in an Idle state of the UE.

In example 24, the subject matter of example 22 or 23 or any of the examples herein, wherein the assistance data is received as broadcast data from the eNBs.

In example 25, the subject matter of example 22 or 23 or any of the examples herein, wherein the assistance data is received as part of a paging message.

In example 26, the subject matter of example 22 or 23, or any of the examples herein, further comprising: means for controlling the obtaining of the measurements only during a discontinuous reception (DRX) period of the UE.

In example 27, the subject matter of example 22 or any of the examples herein, further comprising: means for prioritizing reading of system information (SI) over the obtaining of the measurements.

In example 28, the subject matter of example 22 or any of the examples herein, further comprising: means for prioritizing reading of the measurements over reading of system information (SI).

In example 29, the subject matter of example 27 or any of the examples herein, wherein wherein the device is a narrowband Internet-of-Things (NB-IoT) device.

In a 30$^{th}$ example, a method may comprise: processing Observed Time Difference Of Arrival (OTDOA) assistance data from at least one evolved NodeB (eNB) of a plurality of eNBs associated with a cellular network, controlling, based on the assistance data, obtaining of measurements of position reference signals (PRS) for a plurality of cells associated with the plurality of eNBs, including a reference cell of the UE, over a position measuring period defined based on a product of: a specified amount of samples of the PRS, a period of the PRS; processing the PRS measurements to obtain Reference Signal Time Differences (RSTDs) for the plurality of cells; and reporting the measured RSTD values to at least one of the eNBs.

In example 31, the subject matter of example 30 or any of the examples herein, wherein the OTDOA assistance data is received while in an Idle state of the UE.

In example 32, the subject matter of example 30 or 31 or any of the examples herein, wherein the assistance data is received as broadcast data from the eNBs.

In example 33, the subject matter of example 30, or any of the examples herein, wherein the assistance data is received as part of a paging message.

In example 34, the subject matter of example 30, or any of the examples herein, further comprising controlling the obtaining of the measurements only during a discontinuous reception (DRX) period of the UE.

In example 35, the subject matter of example 30, or any of the examples herein, further comprising: prioritizing reading of system information (SI) over the obtaining of the measurements.

In the preceding specification, various embodiments have been described with reference to the accompanying drawings. It will, however, be evident that various modifications and changes may be made thereto, and additional embodiments may be implemented, without departing from the broader scope as set forth in the claims that follow. The specification and drawings are accordingly to be regarded in an illustrative rather than restrictive sense.

For example, while series of signals and/or operations have been described with regard to FIGS. 2 and 4, the order of the signals/operations may be modified in other implementations. Further, non-dependent signals may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to be limiting. In fact, many of these features may be combined in ways not specifically recited in the claims and/or disclosed in the specification.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used.

What is claimed is:

1. An apparatus for User Equipment (UE), the apparatus comprising:
    an interface to radio circuitry, for a cellular wireless network including a plurality of evolved NodeBs (eNBs);
    one or more processors to:
        process, via the interface to radio circuitry, Observed Time Difference Of Arrival (OTDOA) assistance data from the eNBs;
        determine a positioning measurement period based on a product of a predetermined sufficient number of samples of position reference signals (PRS) and a periodicity of the PRS;
        determine additional wake up occasions in addition to discontinuous reception (DRX) on-durations to measure the PRS within the positioning measurement period;
        control, via the interface to the radio circuitry and based on the assistance data, obtaining of PRS measurements for a plurality of cells associated with the plurality of eNBs, including a reference cell of the UE, over the positioning measurement;
        process the PRS measurements to obtain Reference Signal Time Differences (RSTDs) values for the plurality of cells;
        generate a report, including the RSTD values; and
        control transmitting of the report to at least one of the eNBs.

2. The apparatus of claim 1, wherein the OTDOA assistance data is received while in an Idle state of the UE.

3. The apparatus of claim 1, wherein the assistance data is received as broadcast data from the eNBs.

4. The apparatus of claim 1, wherein the assistance data is received as part of a paging message.

5. The apparatus of claim 1, wherein the one or more processors are further to:
    control the obtaining of the PRS measurements only during DRX occasions of the UE.

6. The apparatus of claim 1, wherein the one or more processors are further to:
    prioritize reading of system information (SI) over the obtaining of the PRS measurements.

7. The apparatus of claim 1, wherein the one or more processors are further to:
    prioritize reading of the PRS measurements over reading of system information (SI).

8. The apparatus of claim 1, wherein the UE is a narrowband Internet-of-Things (NB-IoT) device.

9. A baseband processor of a User Equipment (UE) configured to:
    process Observed Time Difference Of Arrival (OTDOA) assistance data from evolved NodeBs (eNBs), of a cellular wireless network, that are each associated with one or more cells;
    determine a positioning measurement period based on a product of a predetermined sufficient number of samples of position reference signals (PRS) and a periodicity of the PRS;
    determine additional wake up occasions in addition to discontinuous reception (DRX) on-durations to measure the PRS within the positioning measurement period;
    control, based on the assistance data and while the UE is in an Idle state, obtaining of PRS measurements for a plurality of cells, including a reference cell of the UE, over the positioning measurement period;

process the PRS measurements to obtain Reference Signal Time Differences (RSTDs) values for the plurality of cells;

generate a report, including the RSTD values; and control transmitting of the report to at least one of the eNBs.

10. The baseband processor of claim 9, wherein the OTDOA assistance data is received as broadcast data from the eNBs.

11. The baseband processor of claim 9, wherein the assistance data is received as part of a paging message.

12. The baseband processor of claim 9, wherein the one or more processors are further to:

control the obtaining of the PRS measurements only during DRX occasions of the UE.

13. The baseband processor of claim 9, wherein the one or more processors are further to:

prioritize reading of system information (SI) over the obtaining of the PRS measurements.

14. The baseband processor of claim 9, wherein the one or more processors are further to:

prioritize reading of the PRS measurements over reading system information (SI).

15. The baseband processor of claim 9, wherein the UE is a narrowband Internet-of-Things (NB-IoT) device.

16. A method, comprising:

processing Observed Time Difference Of Arrival (OTDOA) assistance data from evolved NodeBs (eNBs), of a cellular wireless network, that are each associated with one or more cells;

determining a positioning measurement period based on a product of a predetermined sufficient number of samples of position reference signals (PRS) and a periodicity of the PRS;

determining additional wake up occasions in addition to discontinuous reception (DRX) on-durations to measure the PRS within the positioning measurement period;

controlling, based on the assistance data and while the UE is in Idle mode, obtaining of PRS measurements for a plurality of cells, including a reference cell of the UE, over the positioning measurement period;

processing the PRS measurements to obtain Reference Signal Time Differences (RSTDs) values for the plurality of cells;

generating a report, including the RSTD values; and controlling transmitting of the report to at least one of the eNBs.

17. The method of claim 16, wherein the assistance data is received in an Idle state of the UE.

18. The method of claim 17, wherein the assistance data is received as broadcast data from the eNBs.

19. The method of claim 17, wherein the assistance data is received as part of a paging message.

20. The method of claim 16, wherein the program instructions further cause the device to:

control the obtaining of the measurements only during DRX occasions of the UE.

21. The method of claim 16, wherein the program instructions further cause the device to:

prioritize reading of system information (SI) over the obtaining of the measurements.

* * * * *